(12) United States Patent
Gordy et al.

(10) Patent No.: US 7,765,536 B2
(45) Date of Patent: *Jul. 27, 2010

(54) SYSTEM AND METHOD FOR THE DISTRIBUTION OF A PROGRAM AMONG COOPERATING PROCESSORS

(75) Inventors: Robert Stephen Gordy, Seminole, FL (US); Terry Spitzer, Virginia Beach, VA (US)

(73) Assignee: Management Services Group, Inc., Virginia Beach, VA (US)

(*) Notice: Subject to any disclaimer, the term of this patent is extended or adjusted under 35 U.S.C. 154(b) by 1252 days.

This patent is subject to a terminal disclaimer.

(21) Appl. No.: 11/313,383

(22) Filed: Dec. 21, 2005

(65) Prior Publication Data

US 2007/0169046 A1    Jul. 19, 2007

(51) Int. Cl.
*G06F 9/45* (2006.01)
(52) U.S. Cl. ....................... 717/161
(58) Field of Classification Search ......... 717/133, 717/149, 151–154, 164, 159–161; 718/1, 718/102, 100, 105; 707/3, 6, 101; 370/389, 370/321, 335, 384; 709/201
See application file for complete search history.

(56) References Cited

U.S. PATENT DOCUMENTS

| | | | |
|---|---|---|---|
| 5,347,639 | A | 9/1994 | Rechtschaffen et al. |
| 5,410,696 | A * | 4/1995 | Seki et al. ............... 717/149 |
| 5,768,594 | A | 6/1998 | Blelloch et al. |
| 5,774,728 | A | 6/1998 | Breslau et al. |
| 6,253,371 | B1 | 6/2001 | Iwasawa et al. |
| 6,292,822 | B1 * | 9/2001 | Hardwick ............... 718/105 |
| 6,339,840 | B1 | 1/2002 | Kothari et al. |
| 6,415,286 | B1 * | 7/2002 | Passera et al. .......... 707/6 |
| 6,434,590 | B1 | 8/2002 | Blelloch et al. |
| 7,530,069 | B2 * | 5/2009 | Kawahara et al. ....... 718/100 |
| 2004/0083475 | A1 | 4/2004 | Todd et al. |
| 2004/0230770 | A1 | 11/2004 | Odani et al. |
| 2007/0143759 | A1 * | 6/2007 | Ozgur et al. ........... 718/102 |

* cited by examiner

*Primary Examiner*—Tuan Anh Vu
(74) *Attorney, Agent, or Firm*—Larson & Larson, P.A.; Frank Liebenow (57) ABSTRACT

A Veil program analyzes the source code and data of a target program and determines how best to distribute the target program and data among the processors of a multi-processor computing system. The Veil program analyzes source code loops, data sizes and types to prepare a set of distribution attempts, whereby each distribution is run under a run-time evaluation wrapper and evaluated to determine the optimal distribution.

21 Claims, 9 Drawing Sheets

Configuration Profile-1

Processors: 32
Connectivity: 10
Performance: 6

610

Configuration Profile-2

Processors: 64
Connectivity: 5
Performance: 9

SYSTEM AND METHOD FOR THE DISTRIBUTION OF A PROGRAM AMONG COOPERATING PROCESSORS

BACKGROUND OF THE INVENTION

1. Field of the Invention

The present invention is directed to the distribution of operations of a source program among a plurality of cooperating processors and more particularly to a system for managing the distribution of operations from unadorned source code with none or limited programmer interaction.

2. Description of the Related Art

In the past many decades, programmers have been writing applications for computers that have progressed from simple, single instruction pointer, linear operation processors to concurrent, multi-processor environments. Current and future computers will have multiple execution units, multiple cores or multiple processors. This is partly because the basic CPU clock frequency will soon hit an upper limit due to problems related to the physics of manufacturing silicon-based semiconductors. Since the invention of the microprocessor around 1970, the complexity (e.g., number of transistors) and clock speed of the microprocessor has continually increased. These increases came about by shrinking the size of the individual transistors within the microprocessor, thereby reducing the capacitance across the transistor and allowing them to switch faster. Currently, a major CPU manufacturer is producing processors with 65 nm geometries. The creation of the microprocessor involves photolithography on a silicon substrate. Unfortunately, due to the size of the light wave passing through the photo mask, there is a limit on how small the mask can be before the mask blocks all light at a given wavelength. Even though doubling of clock speed has not continued over the last few silicon generations, chip die size has continued to increase, providing vast transistor budgets for the chip designer. This has led processor manufacturers into developing processors that have multiple execution units to perform faster multiple tasks in parallel, thereby improving the execution performance of a program at the same or similar clock speeds. The newer generation of processors multi-thread (or hyper thread) or have separate discrete processors that cooperate to execute a single task. One such type of multi-core processor is known as a cell-based processor, in which the processing system is comprised of a large number of independent processors or cells that communicate with each other and accept or pass tasks and results to each other.

Programming languages have also progressed at a rapid rate. In the early years, computers were programmed using panels of wire jumpers or by programming the computer in its machine language. Assemblers were created allowing programmers to program the computer with programs stored on, for example, paper tape, and written in assembly language. The assemblers would then convert program into the machine language for execution. Soon, higher level languages such as FORTRAN, C and PL/1 further removed the programmer from having to know and understand the underlying hardware. Furthermore, specialized languages for specific tasks such as PERL and LISP were created to handle processing needs for certain disciplines such as system administration, system artificial intelligence and simulation/modeling. High level languages are designed to abstract the underlying hardware so that the programmer need not be concerned with the overall architecture of the processing system that will run the resulting executable. Furthermore, high level languages are designed so that the source code can be re-compiled and run on totally different architectures with slight or no changes needed to the source code. This feature makes for portable code, but the ability of the high-level language compilers to optimize the resulting executable program is minimal. Compilers for a given processor architecture may optimize a program by selecting optimal instructions, allocating registers, performing compiler techniques such as loop unrolling and the like. This optimization helps in single processing environments, but falls short in multiple processing environments because the program needs to be divided in a balanced way across several processing elements so that each processing element completes its respective operations at around the same time, thereby not slowing the combined operation down by the slowest link.

Attempts have been made to port existing languages to multiple processor computing systems. To date, these require programmer intervention, in that the programmer needs to understand the underlying processor architecture and direct the program operation onto the various processing elements. This is analogous to the programmer going back to write machine language or assembly language programs, whereby the programmer must understand the underlying architecture and the program is designed to operate exclusively on that architecture. An example of this is SETI (Search for Extra Terrestrial Intelligence), wherein the program is divided into multiple executables enabled for independent execution on most any personal computer so that a small subsection of data and the program is transferred to a "volunteer" personal computer where the program is executed when the personal computer is idle, such as when the screen saver is operating. In this type of application, many processors are performing similar tasks on different slices of a dataset. In this example, a programmer or team designs the program to operate on a pool of clients of a specific architecture such as an industry standard personal computer running one of the Windows® operating systems. The programmer or team of programmers must determine how to sub-divide the program for operation over the pool of processors and must design a front-end that will accept data (in SETI—data from deep-space radio receivers), sub-divide the data, find an available client, transfer the data to the client, wait for the result and combine the results.

Another limitation of using compilers to distribute a program among multiple processors is that the compiler can only evaluate one high level language statement at a time and, for example, dispatching expressions in the a given statement among the multiple processors. Unfortunately, experience has demonstrated that invoking parallelism at such a fine granularity leads to excessive communication overhead compared to the amount of parallel computation achieved.

Another solution is needed that evaluates the program and data as a whole which balances communication/computation tradeoffs before a parallel program decomposition is attempted.

Some programs developed to solve complex problems in fields such as biotechnology or radar analysis require a programmer write an application that performs many independent, yet differing operations. The program may run on a supercomputer comprised of a plurality of processing elements. In some architectures, the processing elements are homogeneous, for example, cell-based architectures. In other architectures, the processing elements are heterogeneous, for example, dedicated super computers having specialized processing elements to perform specific tasks such as Fast-Fourier Transforms. Each operation requires differing resources, thereby requiring the programmer to understand the resource needs of the program as well as the capabilities of various processing units within the supercomputing architecture. Presently, the task of creating software for these architectures requires the programmer to understand the application and the architecture and write specific code to match both. Since this code is specific the target computer system or supercomputer, it is generally difficult to port the program to a different architecture without major redesign. This is analogous to the early years of computers where the programmer had to understand and use the basic machine code of each processor on which they wrote programs. In each of these architectures, a target program, for example a data compression program, must be written and designed for the specific architecture. So being, a target program that compresses video data to fit on a certain media (e.g., Digital Versatile Disk or DVD) would be written by a programmer who understands the architecture and divides the target program's steps between the various processing elements. For example, several processing elements may be assigned to compress a block of video while another processing element may be assigned to decompress that block to feed back error coefficients to the compression steps. Once developed and debugged, the target program may run fine on the target architecture, but when the target architecture becomes obsolete or fails and must be updated to a new architecture, the programmer must re-write much of the target application, porting it to the new architecture.

What is needed is a system that will analyze programs for operation on multiple processing elements and divide the program automatically onto those processing elements for optimal operation, freeing the programmer from becoming an expert regarding the hardware platform.

SUMMARY OF THE INVENTION

An object of the present invention is to provide a transparent compilation and execution environment for an application program with a high performance, single-tier or multi-tier clusters which execute programs in parallel, yielding faster execution than their uni-processor counterparts.

Another object of the present invention is to provide a transparent environment that load-levels single-tiered or multi-tiered clusters to work together as peers or groups of piers, whereby the computational load at one node is transparently spread to other available nodes. Furthermore, when one node completes its tasks, it transparently assists other nodes in completing their tasks. This objective is useful in compute-intensive programs that operate over a long period of time and cannot be easily decomposed into parallel components.

Another object of the present invention is to provide transparent web-service clusters, whereby a number of compute nodes act as front-end routers, spreading incoming data packets (e.g., requests for service) over other cluster nodes that appear as a set of homogeneous Web servers.

Another object of the present invention is to provide transparent single-tiered or multi-tiered storage clusters configured to supply parallel, coherent and highly available access to files in what appears to be one global file system that is constructed from the aggregation of individual file systems. The second-tier file system clusters being configured to be redundant with error correction providing a high-reliability file storage.

Another object of the present invention is to provide transparent, parallel, coherent and highly available access to a database constructed from single-tier or multi-tier storage clusters.

Another object of the present invention is to provide transparent, high availability single-tier and multi-tier clusters of redundant applications, whereby a heartbeat monitor checks the applications and reconfigures the programs when a failure is detected, re-assigning failed nodes with fixed IP-addresses, bad disks, corrupted file systems and/or restarting applications at the most recent valid checkpoint.

In one embodiment, system for optimizing the operation of a program in a multiple-processor computing system is disclosed. The system includes a computer system with multiple processors and a target program written to run on the computer system. A Veil program runs on the computer system to (a) wrap the target program with a run-time analyzer, then (b) select one parallelization strategy from a plurality of parallelization strategies and (c) parallelize the target program according to the selected parallelization strategy. (d) The target program is then executed and (e) execution results are recorded. (f) If there are further parallelization strategies in the plurality of parallelization strategies, steps a-f are repeated, selecting the next parallelization strategy. The execution results from each test are compared and the best parallelization strategy is selected. That parallelization strategy is then used to parallelize the target application.

In another embodiment, computer implemented method for parallelizing of a target program onto a plurality of processors is disclosed including (a) wrapping the target program with a run-time analyzer; (b) selecting one parallelization strategy from a plurality of parallelization strategies and (c) parallelizing the target program according to the one parallelization strategy; (d) executing the target program on the plurality of processors and (e) recording execution results; and (f) if there are further parallelization strategies in the plurality of parallelization strategies, changing the one parallelization strategy to a next parallelization strategy from the plurality of parallelization strategies and repeating steps a-f.

In another embodiment, a system for optimizing the operation of a program in a multiple-processor computing system is disclosed including a computer system with multiple processors and a target program written to run on the computer system. There is a way to wrap the target program with a run-time analyzer means and a way to select one parallelization strategy from a plurality of parallelization strategies. The target program is parallelized according to the one parallelization strategy and executed and execution results are recorded. If there are further parallelization strategies in the plurality of parallelization strategies, the one parallelization strategy is set to a next parallelization strategy from the plurality of parallelization strategies the above is repeated. When no more parallelization strategies remain in the plurality of parallelization strategies, the execution results are compared and the target application is parallelized using the best parallelization strategy having a best execution time.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Reference will now be made in detail to the presently preferred embodiments of the invention, examples of which are illustrated in the accompanying drawings. Throughout the following detailed description, the same reference numerals refer to the same elements in all figures.

Figure 1:
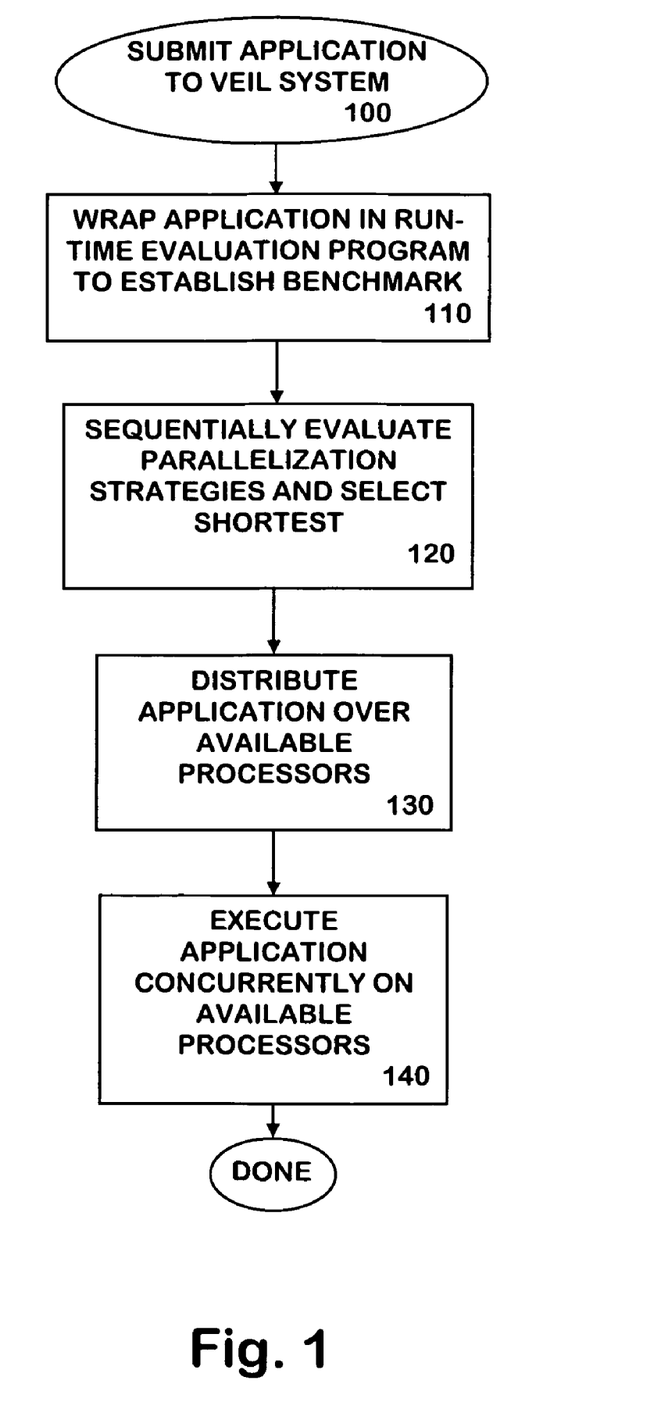
FIG. 1 illustrates a flow chart of the overall system of the present invention.

Referring to FIG. 1, the flow of the overall system of a first embodiment of the present invention is shown. The Veil system provides for compilation and run-time operation of a program over a pool of processors. The Veil system, in general, analyzes the source program in light of the target configuration and spreads the resulting execution over the processors of the target configuration based upon a configuration profile. The Veil system analyzes the program and associated datasets to determine the optimal division of the program and data across the target configuration. For example, a given program and dataset may be divided and distributed differently on a configuration having 32 symmetrical processing elements than on a configuration having 16 symmetrical processing elements and 4 specialized processing elements.

The system starts with a program (an application) submitted to the Veil system 100. The first step is to wrap the program with a run-time evaluation program 110, which embeds measurement tools into the application to monitor various aspects of performance, for example, the volume of input/output and the distribution of input/output bursts.

Figure 2:
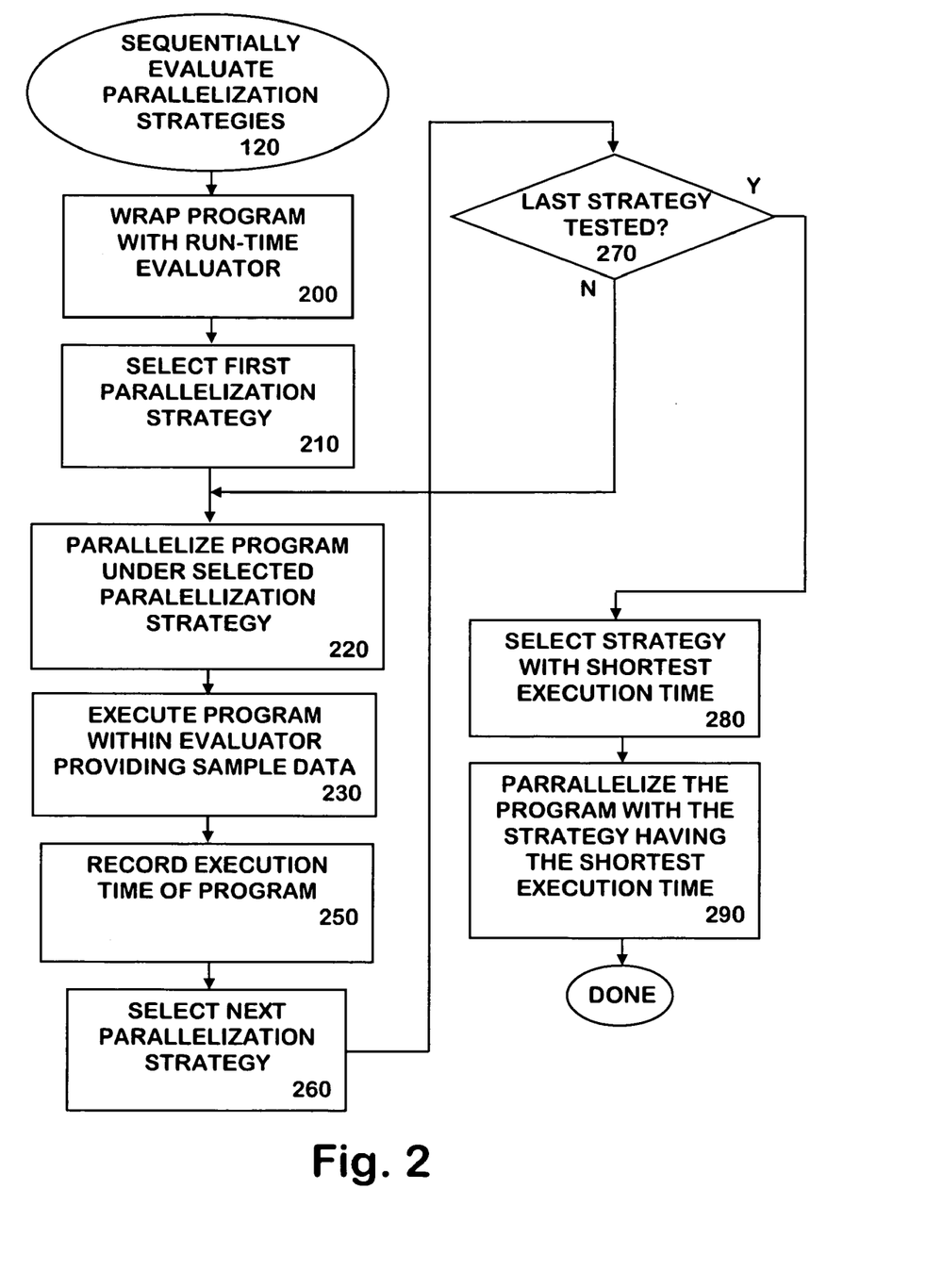
FIG. 2 illustrates a flow chart of the target program analysis of the present invention.

Next, the system sequentially applies a set of parallelization strategies and selects the strategy that performs the best 120 e.g., the shortest execution time (this is described in detail in the description of FIG. 2). Once selected, the Veil system distributes the application over the available processors 130 and the application is executed concurrently on the available processors 140.

Referring to FIG. 2, the flow of the sequentially testing of the strategies as in step 120 above of the first embodiment of the present invention is described. As in FIG. 1, the first step is to wrap the program with a run-time evaluation program 200, which embeds measurement tools into the application to monitor various aspects of performance, for example, the type of I/O operations requested, the number of files accessed, I/O read versus write patterns, or the amount of time a particular code segment takes to execute. Next, a parallelization strategy is selected 210 and the program is divided or parallelized under that strategy 220 and executed across the required processors using a sample dataset 230. When the execution is complete, execution performance data from the run-time evaluator is recorded 250. Next, another parallelization strategy is selected 260 and if there are more strategies to test 270, steps 220 through 270 are performed on those strategies. If there are no more strategies to test 270, the strategy with the shortest execution time is selected 280 and the target program is then parallelized using the strategy with the shortest execution time 290.

The parallelization strategies (not shown in the figures) analyze the source code to determine methods of properly utilizing multiple parallel processors. A first strategy looks for loops within the source code with a large number of iterations, whereby the loops can be subdivided across the available processors. For example, if a particular loop is performed for one million iterations and there are 10 processors available, the loop is duplicated on each of the 10 processors and each processor handles 100,000 iterations, thereby increasing performance ten-fold. Another strategy looks for linear searches of long data structures. In this strategy, the search code is distributed across the available processors and each processor is provided a random starting point (seed) for its search, thereby, probabilistically, one processor will quickly find the target of the search. Another strategy includes detecting two or more processing stages which are then distributed across the available processors, whereby data is then passed from an input processor to the stage-one processor to the stage-two processor and so on until the last stage processor produces the final output. This strategy exploits parallelism through pipelining. It is based upon the assumption that if a procedure is repeated n or more times, then the n pipeline stages will speed the procedure by n times. This type of parallelism will be combined with the data input models described later.

Referring to FIG. 3a-d in conjunction with FIG. 4, the flow of the data analysis of the first embodiment of the present invention is shown. In this stage of the Veil system, the data is analyzed to determine the optimal division of the application over the available processors. The data analysis 300 begins with determining if the data is a single, contiguous data set 310, such as a long file. If it is, flow continues to divide the program accordingly 350 (see FIG. 3b). If not, it is determined if the data comes in bursts 320. If it does, flow continues to divide the program accordingly 360 (see FIG. 3c). If not, it is determined if the data comes as one continuous data stream 330. If it does come as a continuous stream, flow continues to divide the program optimally for a continuous data stream 370 (see FIG. 3d). If not, it has been determined that parallelization based upon data analysis cannot be performed 340 and this stage of the analysis is complete.

Figure 3A:
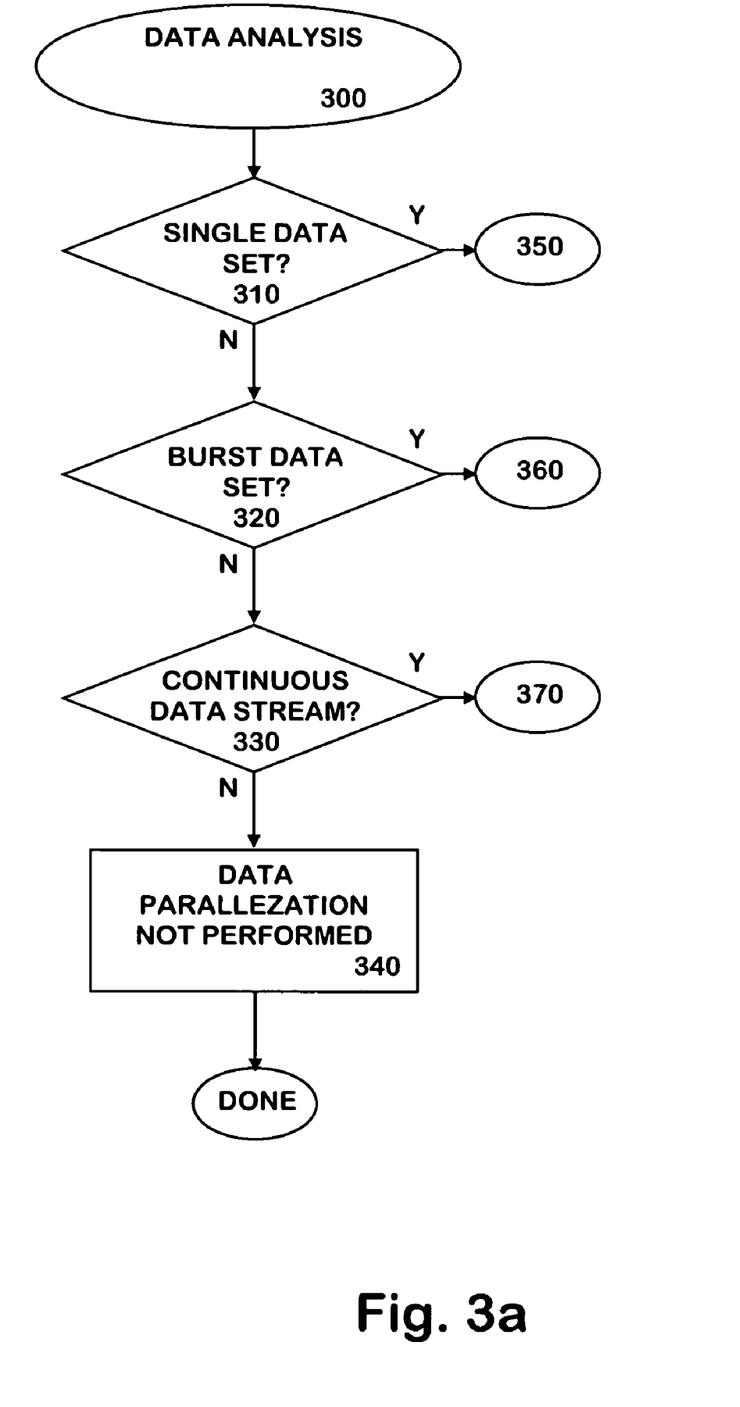
FIG. 3a-d illustrates a flow chart of the data analysis of the present invention.
Figure 3B:
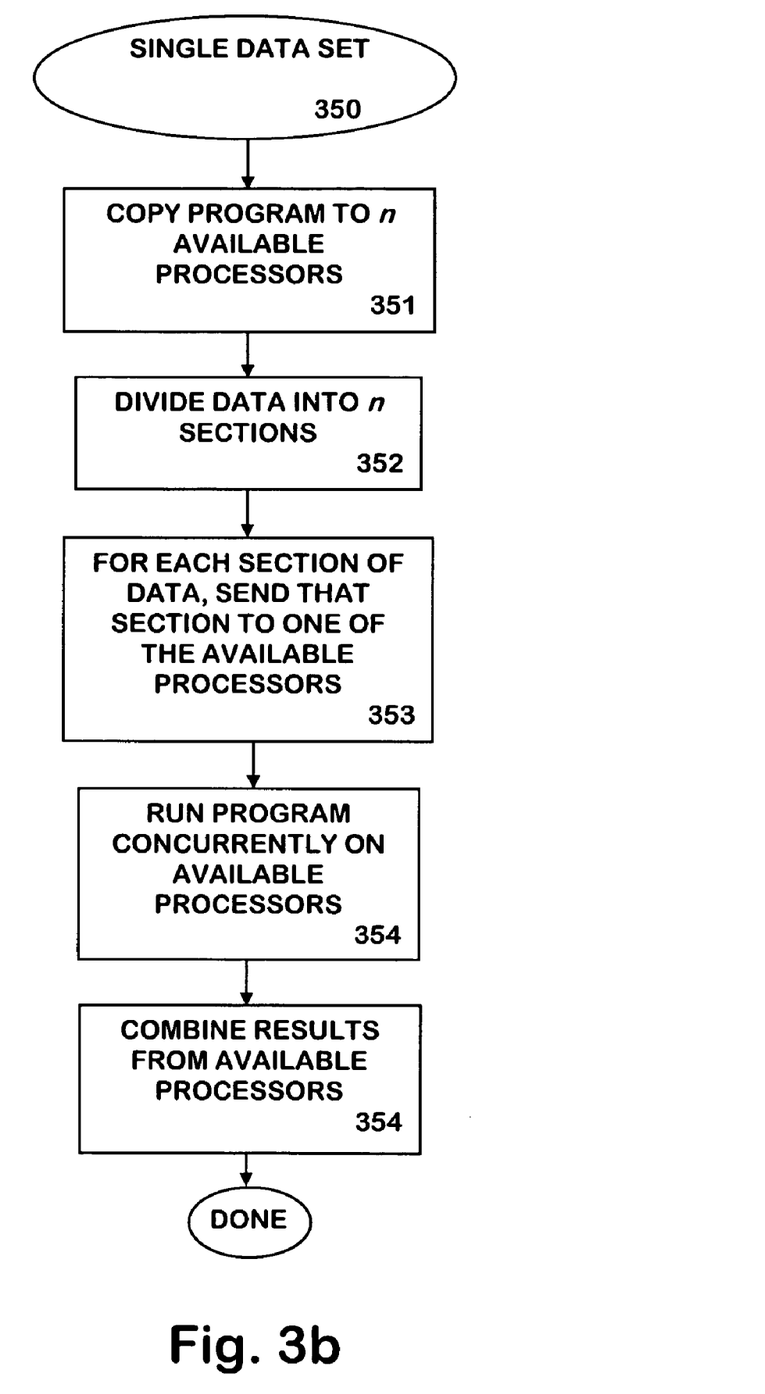

Referring now to FIG. 3b, the data has been analyzed and it has been determined that the data is a single data set 350. In this case, the Veil system copies the program or data processing sections of the program onto the available processors 351. In some embodiments, the number of available processors, n, is obtained from a profile (shown in FIG. 6). Next, the data is divided into n sections 352. For example, if the data is 10 MB and there are 10 processors (n=10), then the program is copied onto the 10 processors and the data is divided into 10 sections. Next, for each section of data, send that section of data to one of the available processors 353. This can be done in many ways known in the art. For example, each program on each processor is passed a file pointer to the file and a unique offset (in the example above, the first processor would be passed an offset of 0, the second an offset of 1,000,000, and so on). Alternately, the data is divided into n separate files and a file pointer to the first file passed to the first processor, a file pointer to the second file passed to the second processor, and so on There are other ways to communicate files and sections of files as known in the art.

Next, the program on each processor is run concurrently on each processor 354, each operating on its section of the data set. Once all processors complete their operation upon the data, the results are combined 354.

Figure 3C:
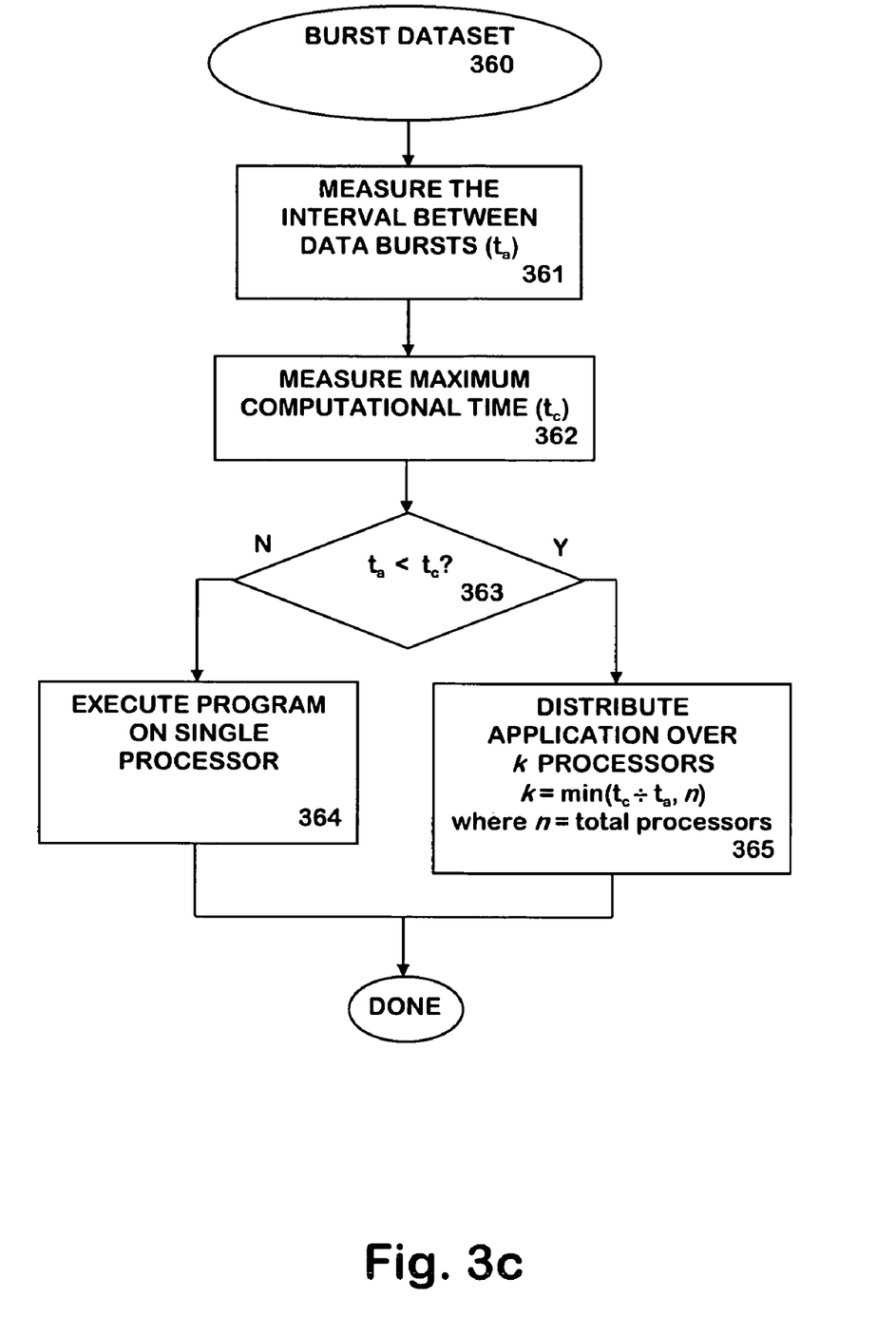
Figure 4A:
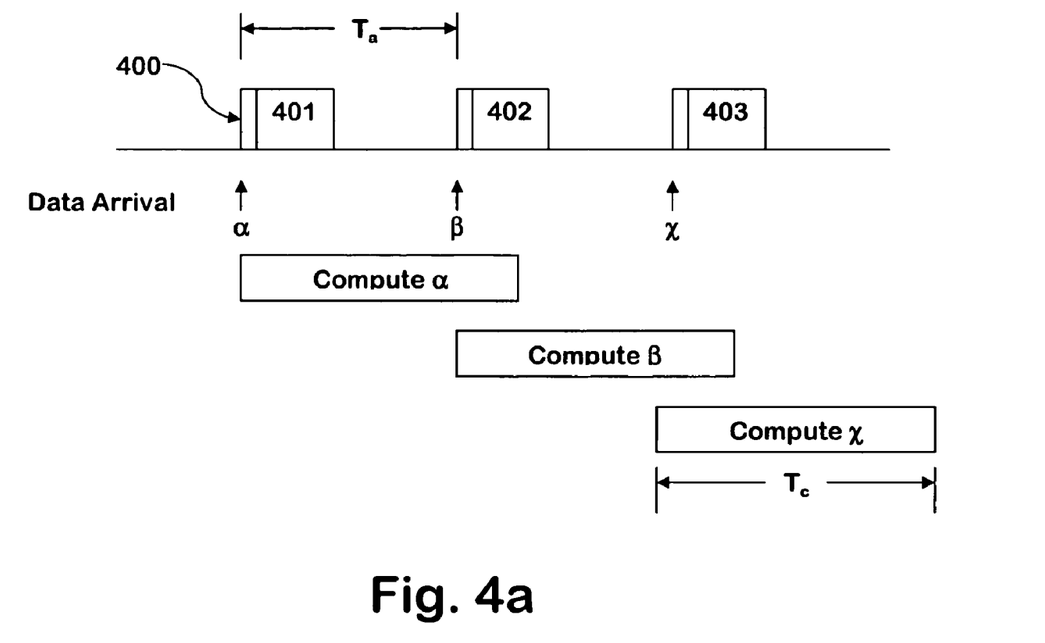
FIG. 4 illustrates a timing chart of the data analysis of the present invention.
Figure 4B:
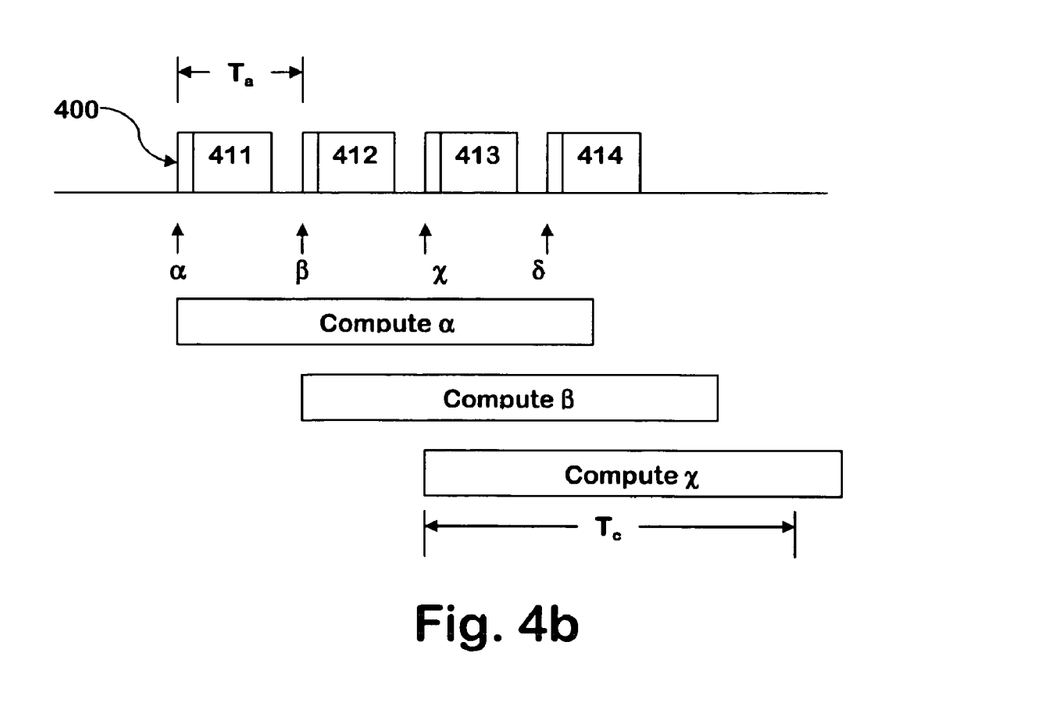

Referring now to FIGS. 3c, 4a and 4b, the data has been analyzed and it has been determined that the data is a burst data set 360. In this case, the Veil system measures the interval between data bursts, $t_a$ 361 and runs the program with a typical input to measure its computational time $t_c$ 362. If the inter-arrival time $t_a$ is less than the computational time $t_c$ 363, the Veil system copies the program or data processing sections of the program onto some number, k, of available processors 365. This number of processors, k, is a number between 2 and the total available processors n. In some embodiments, the number of available processors, n, is obtained from a profile (shown in FIG. 6). The number of processors used, k, is first determined by dividing the computational $t_c$ time by the inter-arrival time $t_a$ and rounding up to the next whole number. If the resulting value of k is greater than n, then the system will not be able to perform in real-time and k will be set to the value of n. FIG. 4a shows an example of burst data. The inter-arrival time $t_a$ is the time difference between the earliest arrival times 400 of two successive data bursts 401/402. The compute time $t_c$ is the processing time required to process the a data burst on a single processor. In the example of FIG. 4a, the compute time $t_c$ is slightly longer than the inter-arrival time $t_a$. Therefore, if only one processor was used, it would not be finished processing the first data burst 401 when the second data burst 402 arrives but would be finished when the third burst 403 arrives. In this example, if we assume the inter-arrival time $t_a$ is 5 seconds and the compute time $t_c$ is 7 seconds, we set k to 7/5, rounded up to k=2. Therefore, if two processors are used, the data bursts can be processed in real time. In this example, the first processor would process the first burst 401, the second processor would process the second burst 402 and the first processor would be finished processing the first burst 401 and be ready to process the third burst 403 when it arrives.

FIG. 4b shows another example of burst data that arrives faster than that of FIG. 4a. The inter-arrival time $t_a$ is again the time difference between the earliest arrival times 400 of two successive data bursts 411/412. The compute time $t_c$ is the processing time required to process the a data burst on a single processor. In the example of FIG. 4b, the compute time $t_c$ is much longer than the inter-arrival time $t_a$. Therefore, if only one processor was used, it would not be finished processing the first data burst 411 when the second data burst 412 arrives, or for that matter, when the third data burst 413 and fourth data burst 414 arrives. In this example, if we assume the inter-arrival time $t_a$ is 5 seconds and the compute time $t_c$ is 17 seconds, we set k to 17/5, rounded up to k=4. Therefore, if four processors are available and are used, the data bursts can be processed in real time. In this example, the first processor would process the first burst 411, the second processor process the second burst 412, the third processor would process the third burst 413 and the fourth processor would process the fourth burst 414. By the time the next data burst arrives (not shown), the first processor would be finished processing the first data burst 411 and be ready to process the fifth data burst, and so on. Referring back to FIG. 3c, if the inter-arrival time $t_a$ is greater than the computational time $t_c$, then a single processor is capable of processing each data burst before the next data burst arrives and only one processor need be used (k=1). If additional processors are available, they are allocated to a pool of processor groups arranged into a hierarchy, called sub-groups. In this case, work allocated to an individual processor is shared with members from the sub-group.

Figure 3D:
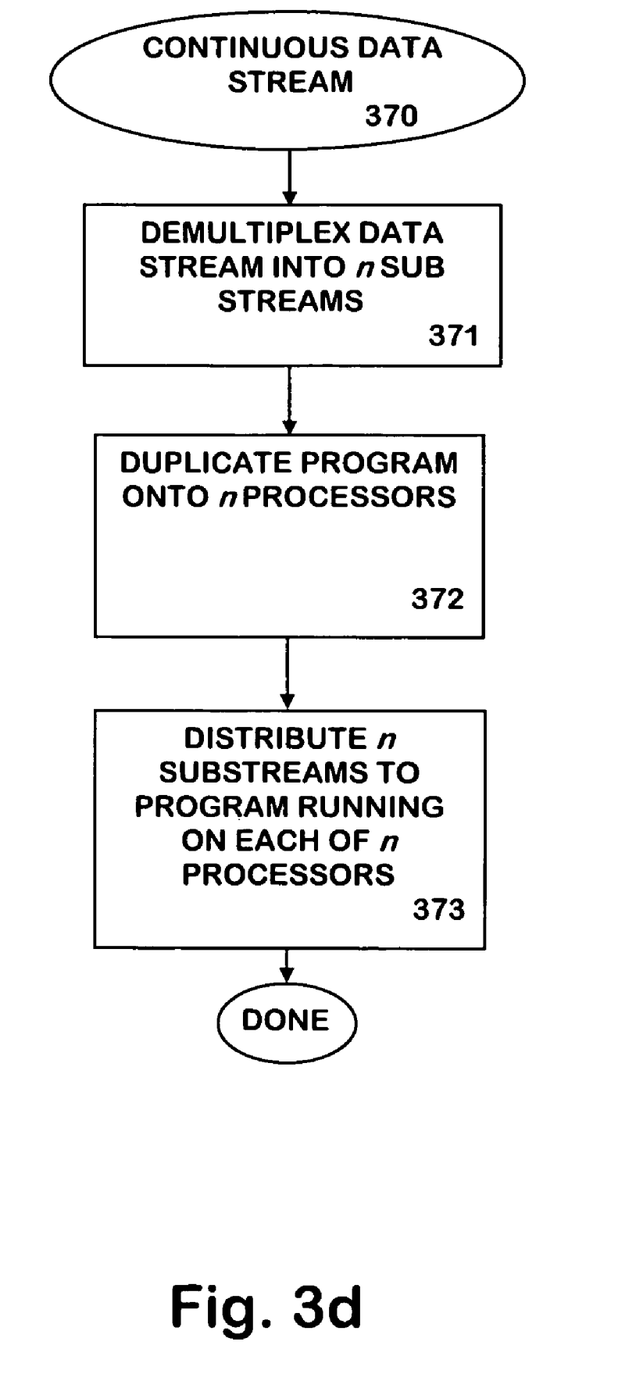

Referring now to FIG. 3d, the data has been analyzed and it has been determined that the data is a continuous stream 370. In this case, the Veil system demultiplexes the data into n sub streams, one for each available processor. In some embodiments, the number of available processors, n, is obtained from a profile (shown in FIG. 6). Next, the program is duplicated onto n processors 372 and the n substreams are distributed, one to each of the n processors 373.

Figure 5:
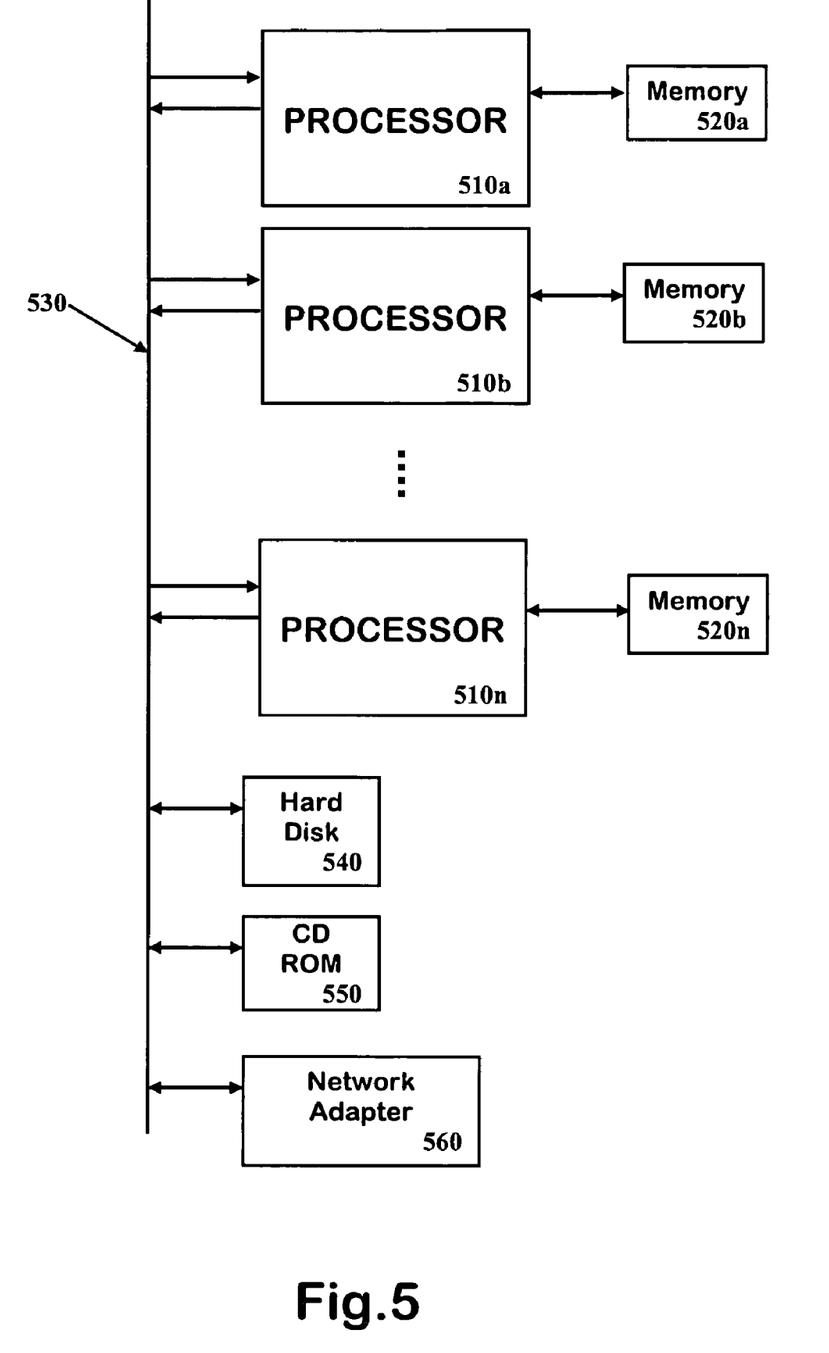
FIG. 5 illustrates a typical computing environment of all embodiments of the present invention.

Referring to FIG. 5, a schematic block diagram of a computer-based system of the present invention is shown. In this example, multiple processors 510a-n are provided to execute stored programs that are generally stored within a local memory 520a-n. The processors 510a-n can be any processor, perhaps an Intel Pentium-5 ® CPU or the like. The local memory 520a-n is connected to the processor and can be any memory suitable for connection with the selected processor 510a-n, such as SRAM, DRAM, SDRAM, RDRAM, DDR, DDR-2, etc.

The processors 510a-n are connected to each other and communicate over a system bus 530. Peripheral devices such as a hard disk 540, a CDROM 550 and a network adapter 560 interface with one or more of the processors 510a-n over the system bus 530. Not shown are other input output devices such as displays, keyboard, mice and the like which may be connected to one particular processor or to the system bus 530. It is also possible that an additional shared memory unit is attached to the system bus 530. It is further possible that the processors 510a-n share a common memory and communicate with each through the shared memory, possibly using semaphores within the shared memory to synchronize operations. The construction of a multi-processor computing system is well known in the industry and the system shown in FIG. 5 is only an example of one such architecture.

In general, the hard disk 540 may be used to store programs, executable code and data persistently while the CDROM 550 may be used to load the programs, executable code and data from removable media onto the hard disk 540. These peripherals are meant to be examples of input/output devices, persistent storage and removable media storage. Other examples of persistent storage include core memory, FRAM, flash memory, etc. Other examples of removable media storage include CDRW, DVD, DVD writeable, compact flash, other removable flash media, floppy disk, ZIP®, laser disk, etc.

Figure 6A:
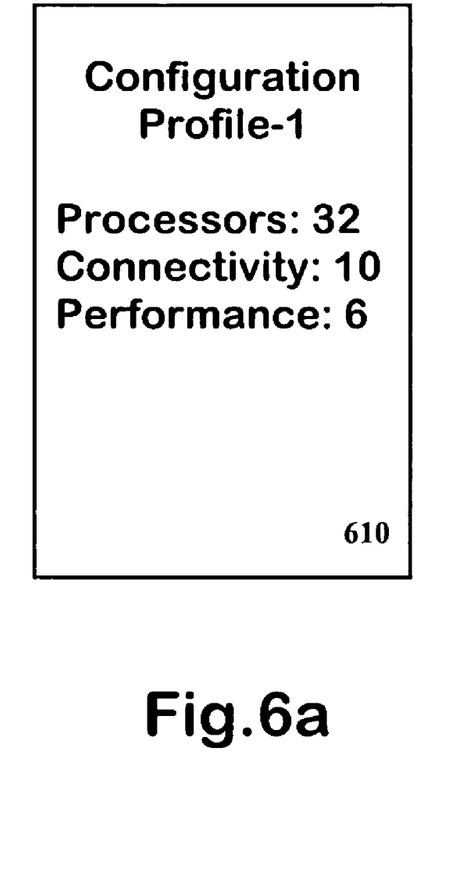
FIG. 6 illustrates a typical configuration profile of a multi-processor computing system of all embodiments of the present invention.
Figure 6B:
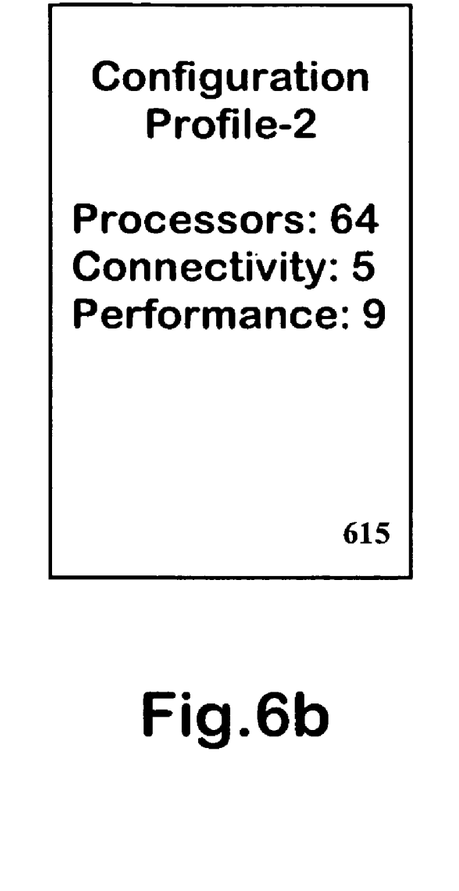

Referring to FIG. 6a and FIG. 6b, a typical profile is shown for two different parallel configurations. In FIG. 6a, a first configuration profile 610 is shown, declaring that there are 32 parallel processing elements with a connectivity score of 10 and a performance factor of 6. The number of processors, n, is used as previously discussed to determine a maximum of how many times the program is divided, in this case 32. In FIG. 6b, a second configuration profile 615 is shown, declaring that there are 64 parallel processing elements with a connectivity score of 5 and a performance factor of 9. The number of processors, n, is used as previously discussed to determine a maximum number of how many times the program is divided, in this case 32. The connectivity number is a relative number indicating how well the processors are connected to the system. If all processors are connected by shared memory, this number is higher (e.g., 10). If the processors are connected on a high speed data bus, this number is somewhat less, for example 7. If the processors are coupled by a network such as Ethernet (10 Megabit), this number will be low, for example 1. The performance number is a relative number indicating how fast each individual processor operates. For example, if each processor is an Intel Pentium IV® running at a 3.4 GHz clock speed, the performance number is, for example, 10. If each processor is an Intel Pentium II® running at a 133 MHz clock speed, the performance number is, for example, 2 The connectivity number and the performance number are used in some embodiments to optimize the division of a program across the available processors. For example, given a configuration of profile-1 610, optimizations are made favoring large amounts of data being transferred between processors, while in a configuration of profile-2 615, the performance cost of transferring large amounts of data between processors dictates that dividing the program needs to be divided to minimize the amount of data transferred between processors.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for optimizing the operation of a program in a multiple-processor computing system, the system comprising:
   a computer system comprising a plurality of processors;
   a target program written to run on the computer system;
   a Veil program having coded therein a means to:
   (a) wrap the target program with a run-time analyzer;
   (b) select one parallelization strategy from a plurality of parallelization strategies;
   (c) parallelize the target program according to the one parallelization strategy;
   (d) execute the target program;
   (e) record execution results of the target program; and
   (f) if there are further parallelization strategies in the plurality of parallelization strategies, change the one parallelization strategy to a next parallelization strategy from the plurality of parallelization strategies and repeat steps a-f;
   (g) compare the execution results and select a best parallelization strategy having a best execution result;
   (h) parallelize the target application using the best parallelization strategy with the best execution result;
   (i) analyze a target data on which the target program is designed to operate;
   (j) if the target data is a contiguous dataset then:
   determine a number n of available processors;
   copy at least part of the target program onto n available processors;
   divide the target data into the number n segments of data;
   run the at least part of the target program on the available processors, each operating upon one of the number n segments of data;
   combine the results from the available processors;
   (k) if the target data is burst data then:
   measure an interval between bursts;
   measure a computational time of the target program;
   if the interval between bursts is less than the computational time then determine the number n of the available processors and distribute at least part of the target program over the available processors;
   if the interval between bursts is not less than the computational time then execute the program on one available processor;
   (l) if the target data is a continuous data stream then:
   determine the number n of the available processors;
   duplicate at least part of the target program onto the available processors; and
   demultiplex the target data into the number n sub-streams, where the number n sub-streams matches the number n of the available processors.

2. The system of claim 1, wherein the plurality of parallelization strategies includes detecting a program loop.

3. The system of claim 1, wherein the run-time analyzer is adapted to record types of input-output operations requested by the target program.

4. The system of claim 1, wherein the run-time analyzer is adapted to record a number of files accessed by the target program.

5. The system of claim 1, wherein the run-time analyzer is adapted to record input/output read/write patterns requested by the target program.

6. The system of claim 1, wherein the number n is read from a configuration profile.

7. A computer implemented method for parallelizing of a target program onto a plurality of processors, the method comprising:
   (a) wrapping the target program with a run-time analyzer;
   (b) selecting one parallelization strategy from a plurality of parallelization strategies;
   (c) parallelizing the target program according to the one parallelization strategy;
   (d) executing the target program on the plurality of processors;
   (e) recording execution results of the target program;
   (f) if there are further parallelization strategies in the plurality of parallelization strategies, changing the one parallelization strategy to a next parallelization strategy from the plurality of parallelization strategies and repeating steps a-f;
   (g) analyzing a target data on which the target program is designed to operate;
   (h) if the target data is a contiguous dataset then:
   determining a number n of available processors;
   copying at least part of the target program onto the available processors;
   dividing the target data into the number n segments of data;
   running the at least part of the target program on the available processors, each of the available processors operating upon one of the number n segments of data;
   combining the results from the available processors;
   (i) if the target data is burst data then:
   measuring an interval between bursts;
   measuring a computational time of the target program;
   if the interval between bursts is less than the computational time then determining the number n of the available processors and distributing the at least part of the target program over the n available processors;
   if the interval between bursts is not less than the computational time then executing the program on one available processor; and
   (j) if the target data is a continuous data stream then:
   determining the number n of available processors;
   duplicating the at least part of the target program onto the available processors; and
   demultiplexing the target data into the number n sub-streams, where the number n sub-streams matches the number n available processors.

8. The computer implemented method of claim 7, wherein the plurality of parallelization strategies includes detecting a program loop.

9. The computer implemented method of claim 8, wherein the execution results include a number of times the program loop iterates.

10. The computer implemented method of claim 7, wherein the run-time analyzer is adapted to measure types of input-output operations requested by the target program.

11. The computer implemented method of claim 7, wherein the run-time analyzer is adapted to measure a number of files accessed by the target program.

12. The computer implemented method of claim 7, wherein the run-time analyzer is adapted to measure input/output read/write patterns requested by the target program.

13. The system of claim 7, wherein the number n is read from a configuration profile.

14. The system of claim 7, further comprising:
if there still remain unassigned processors, then allocating the unassigned processors to assist the assigned processors as a sub-group.

15. A system for optimizing the operation of a program in a multiple-processor computing system, the system comprising:
(a) a computer system comprising a plurality of processors;
(b) a target program written to run on the computer system;
(c) a means to wrap the target program with a run-time analyzer means;
(d) a means to select one parallelization strategy from a plurality of parallelization strategies;
(e) a means to parallelize the target program according to the one parallelization strategy;
(f) a means to execute the target program;
(g) a means to record execution results of the target program; and
(h) if there are further parallelization strategies in the plurality of parallelization strategies, a means to change the one parallelization strategy to a next parallelization strategy from the plurality of parallelization strategies and repeat steps c-h;
(i) a means to compare the execution results and select a best parallelization strategy having a best execution time;
(j) a means to parallelize the target application using the best parallelization strategy with the best execution time;
(k) a means to analyze a target data on which the target program is designed to operate;
(l) if the target data is a contiguous dataset then:
a means to determine a number n of available processors;
a means to copy at least part of the target program onto the available processors;
a means to divide the target data into the number n segments of data;
a means to run the at least part of the target program on the available processors, each operating upon one of the n segments of data;
a means to combine the results from the available processors;
(m) if the target data is burst data then:
a means to measure an interval between bursts;
a means to measure a computational time of the target program;
if the interval between bursts is less than the computational time then a means to determine the number n of the available processors and a means to distribute the at least part of the target program over the available processors;
if the interval between bursts is not less than the computational time then a means to execute the program on one available processor; and
(n) if the target data is a continuous data stream then:
a means to determine the number n of available processors;
a means to duplicate the at least part of the target program onto the available processors; and
a means to demultiplex the target data into the number n sub-streams, where the number n sub-streams matches the number n available processors.

16. The system of claim 15, wherein the plurality of parallelization strategies includes a means to detect a program loop.

17. The system of claim 15, wherein the run-time analyzer means measures a number of files accessed by the target program.

18. The system of claim 15, wherein the run-time analyzer means measures a type of input/output operation requested by the target program.

19. The system of claim 15, wherein the run-time analyzer means measures input/output read/write patterns requested by the target program.

20. The system of claim 15, wherein the number n is read from a configuration profile.

21. The system of claim 15, further comprising:
if there still remain unassigned processors, then allocating the unassigned processors to assist the assigned processors as a sub-group.

* * * * *